United States Patent
Sasaki (10) Patent No.: US 10,532,621 B2
(45) Date of Patent: Jan. 14, 2020

(54) MOUNTING STRUCTURE FOR SUSPENSION ARM, AND WORKING VEHICLE

(71) Applicant: Komatsu Ltd., Minato-ku, Tokyo (JP)

(72) Inventor: Taiga Sasaki, Hitachinaka (JP)

(73) Assignee: Komatsu Ltd., Tokyo (JP)

(*) Notice: Subject to any disclaimer, the term of this patent is extended or adjusted under 35 U.S.C. 154(b) by 14 days.

(21) Appl. No.: 15/756,618

(22) PCT Filed: Mar. 16, 2016

(86) PCT No.: PCT/JP2016/058415
§ 371 (c)(1),
(2) Date: Mar. 1, 2018

(87) PCT Pub. No.: WO2017/158780
PCT Pub. Date: Sep. 21, 2017

(65) Prior Publication Data
US 2018/0244118 A1    Aug. 30, 2018

(51) Int. Cl.
*B60G 7/02* (2006.01)
*B60G 3/20* (2006.01)

(52) U.S. Cl.
CPC .............. *B60G 7/02* (2013.01); *B60G 3/20* (2013.01); *B60G 2200/144* (2013.01);
(Continued)

(58) Field of Classification Search
CPC ...... B60G 3/20; B60G 7/02; B60G 2200/144; B60G 2200/154; B60G 2200/156;
(Continued)

(56) References Cited

U.S. PATENT DOCUMENTS

| | | | |
|---|---|---|---|
| 2,169,336 A * | 8/1939 | Best | B60G 3/26 267/254 |
| 2,496,906 A * | 2/1950 | Churchill | B60G 11/08 267/230 |

(Continued)

FOREIGN PATENT DOCUMENTS

| | | |
|---|---|---|
| JP | 59-182407 | 12/1984 |
| JP | 02-15651 | 1/1990 |

(Continued)

OTHER PUBLICATIONS

International Preliminary Report on Patentability in International Application No. PCT.JP2016/058415, dated Sep. 18, 2018, 7 pages, with English translation.
(Continued)

*Primary Examiner* — Laura Freedman
(74) *Attorney, Agent, or Firm* — Fish & Richardson P.C.

(57) ABSTRACT

A suspension arm A-shaped in a plan view includes legs receiving therebetween front and rear surfaces of a vertical member arranged in a travel direction of a working vehicle. The legs of the suspension arm and the surfaces of the vertical member each have a hole. An attaching structure includes: a cantilevered pin inserted into the hole of each of the legs and the corresponding hole of the vertical member to hold the leg of the suspension arm such that the suspension arm is pivotable; and a retaining mechanism provided to a frame to prevent the pin from coming off the vertical member. The pin includes a projection extending radially outward at a base end in an insertion direction. The retaining mechanism includes: a holding portion holding the projection in a rotation direction of the pin; and a cover portion covering the projection in the insertion direction of the pin.

6 Claims, 11 Drawing Sheets

(52) U.S. Cl.
CPC .. *B60G 2204/143* (2013.01); *B60G 2204/418* (2013.01); *B60G 2204/4302* (2013.01); *B60G 2300/026* (2013.01)

(58) Field of Classification Search
CPC ........ B60G 2206/124; B60G 2300/026; B60G 2204/143; B60G 2204/1431; B60G 2204/418; B60G 2204/4302
See application file for complete search history.

(56) References Cited

U.S. PATENT DOCUMENTS

| | | | | |
|---|---|---|---|---|
| 2,855,212 | A * | 10/1958 | Houser | B60G 7/001 280/6.157 |
| 2,873,980 | A * | 2/1959 | Thomas | B60G 7/00 280/124.134 |
| 2,876,018 | A * | 3/1959 | Kishline | B60G 3/20 280/124.135 |
| 2,913,251 | A * | 11/1959 | Herbenar | B60G 7/02 280/124.136 |
| 2,996,308 | A * | 8/1961 | Cislo | B60G 7/005 280/86.756 |
| 4,170,373 | A * | 10/1979 | Beck | B60G 7/001 280/124.141 |
| 6,457,728 | B1 * | 10/2002 | Klais | B60G 7/02 280/86.75 |
| 6,470,991 | B1 * | 10/2002 | Bowman | B60G 3/18 180/312 |
| 9,643,527 | B2 * | 5/2017 | Uranaka | B60G 3/20 |
| 9,868,343 | B2 * | 1/2018 | Uranaka | B62D 21/11 |
| 10,343,510 | B2 * | 7/2019 | Uranaka | B60K 11/06 |
| 2010/0117324 | A1 | 5/2010 | Hirai | |
| 2017/0015352 | A1 | 1/2017 | Uranaka et al. | |

FOREIGN PATENT DOCUMENTS

| | | |
|---|---|---|
| JP | 08-25931 | 1/1996 |
| JP | 3126970 | 10/2006 |
| JP | 200929157 | 2/2009 |
| JP | 2014-237299 | 12/2014 |
| WO | WO2015-129010 | 9/2015 |

OTHER PUBLICATIONS

International Search Report in International Application No. PCT/JP2016/058415, dated Jun. 7, 2016, 9 pages (with partial English translation).

* cited by examiner

MOUNTING STRUCTURE FOR SUSPENSION ARM, AND WORKING VEHICLE

CROSS-REFERENCE TO RELATED APPLICATIONS

This application claims priority to International Application No. PCT/JP2016/058415 filed on Mar. 16, 2016, the contents of which are incorporated herein in their entirety.

TECHNICAL FIELD

The present invention relates to a suspension arm attaching structure, and a working vehicle.

BACKGROUND ART

A typically known attaching structure for double wishbone suspension arms for automobiles and the like includes an suspension arm, which is in an A-shape in a plan view, pivotably attached to a frame using a pin penetrating through a leg of the suspension arm (see, for instance, Patent Literature 1).

Similarly, a known attaching structure for suspension arms for motorcoaches and the like allows an A-shaped suspension arm, legs of which are each provided with a pin, to be pivotably attached to a frame using a bushing (see, for instance, Patent Literature 2).

CITATION LIST

Patent Literature(S)

Patent Literature 1 JP 08-025931 A
Patent Literature 2 Japanese Utility Model Application Publication No. 59-182407

SUMMARY OF INVENTION

Problems to be Solved by the Invention

A large working vehicle, such as a dump truck, designed to operate in a digging site (e.g., mines) inevitably receives an impact force when traveling, and thus needs to be manufactured to be stronger than a frame of a passenger automobile. Additionally, since the carrying capacity of such a large dump truck or the like is increased in terms of transport efficiency, the firmness of an attaching structure for a suspension arm needs to be sufficiently increased.

Unfortunately, the techniques disclosed in Patent Literature 1 and Patent Literature 2 are unlikely to allow for attaching a suspension arm to a strong frame and sufficiently increasing the firmness of an attaching structure for a suspension arm.

An object of the invention is to provide a suspension arm attaching structure that allows an suspension arm to be attached to a large and strong frame, and a working vehicle.

Means for Solving the Problems

According to an aspect of the invention, a suspension arm attaching structure for attaching at least one suspension arm to at least one vertical member of a frame of a working vehicle, the suspension arm being an A-shaped suspension arm in a plan view that includes legs configured to receive therebetween front and rear surfaces of the vertical member arranged in a travel direction of the working vehicle, the legs of the suspension arm and the first and rear surfaces of the vertical member each being provided with a hole, the attaching structure includes: a cantilevered pin configured to be inserted into the hole of each of the legs of the suspension arm and into corresponding one of the holes of the vertical member to hold the leg of the suspension arm such that the suspension arm is pivotable; and a retaining mechanism for the pin provided to the frame, in which the pin includes a projection at a base end thereof in an insertion direction, the projection extending radially outward, and the retaining mechanism includes: a holding portion configured to hold the projection in a rotation direction of the pin; and a cover portion configured to cover the projection in the insertion direction of the pin.

In the above aspect, the suspension arm receives the front and rear surfaces of the frame, and the cantilevered pin is inserted into the suspension arm. The suspension arm can thus be attached even to a strong frame. Further, the retaining mechanism for preventing the cantilevered pin from coming off the vertical member can increase the firmness of the suspension arm attaching structure.

Additionally, the cantilevered pin is used to attach the suspension arm, allowing the legs to be individually attached to the front and rear surfaces of the vertical cross member with an excellent work efficiency.

In the above aspect, it is preferable that the holes of the suspension arm are each provided with a first bushing.

In the above aspect, it is preferable that the first bushing has an inner surface provided with a groove for receiving a lubricating oil.

In the above aspect, it is preferable that the holes of the vertical member are each provided with a second bushing including a second flange for covering the front surface or the rear surface of the vertical member, the first bushing of the suspension arm includes a first flange in a surface being brought into contact with the vertical member, and the first and second flanges of the first and second bushings slide as the suspension arm rotates.

A working vehicle includes the suspension arm attaching structure of the above aspect.

In the above aspect, it is preferable that the frame includes: the at least one vertical member including a first vertical member and a second vertical member each located at an end in a vehicle-width direction orthogonal to the travel direction; and a cross member extending in the vehicle-width direction and connecting a lower end of the first vertical member to a lower end of the second vertical member, the cross member being configured to accommodate therein a traveling drive motor.

DESCRIPTION OF EMBODIMENT(S)

Exemplary embodiment(s) of the invention will be described below with reference to the attached drawings.

1. Description of Overall Arrangement of Dump Truck 1

Figure 1:
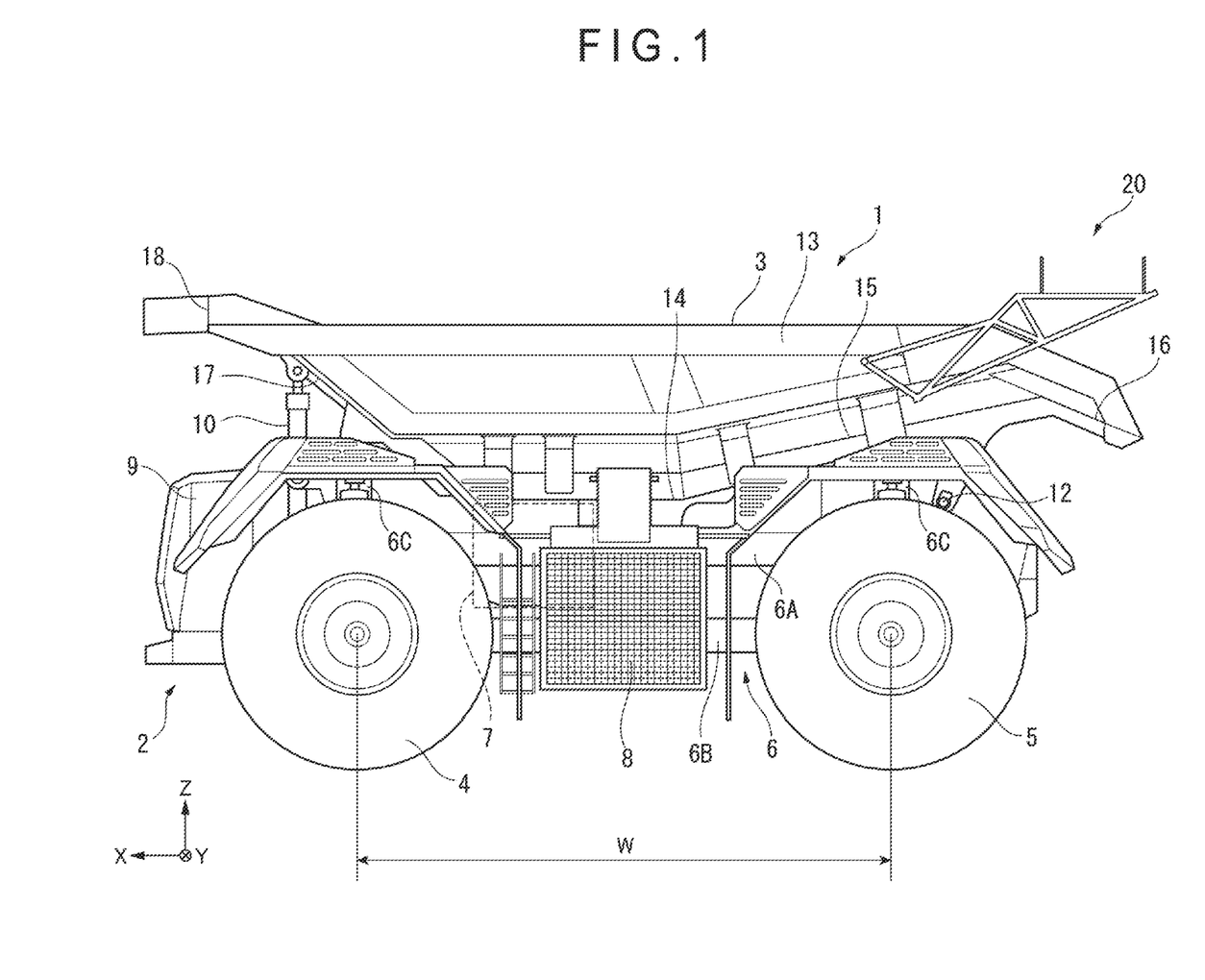
FIG. 1 is a side elevational view showing a structure of a dump truck according to an exemplary embodiment of the invention.
Figure 2:
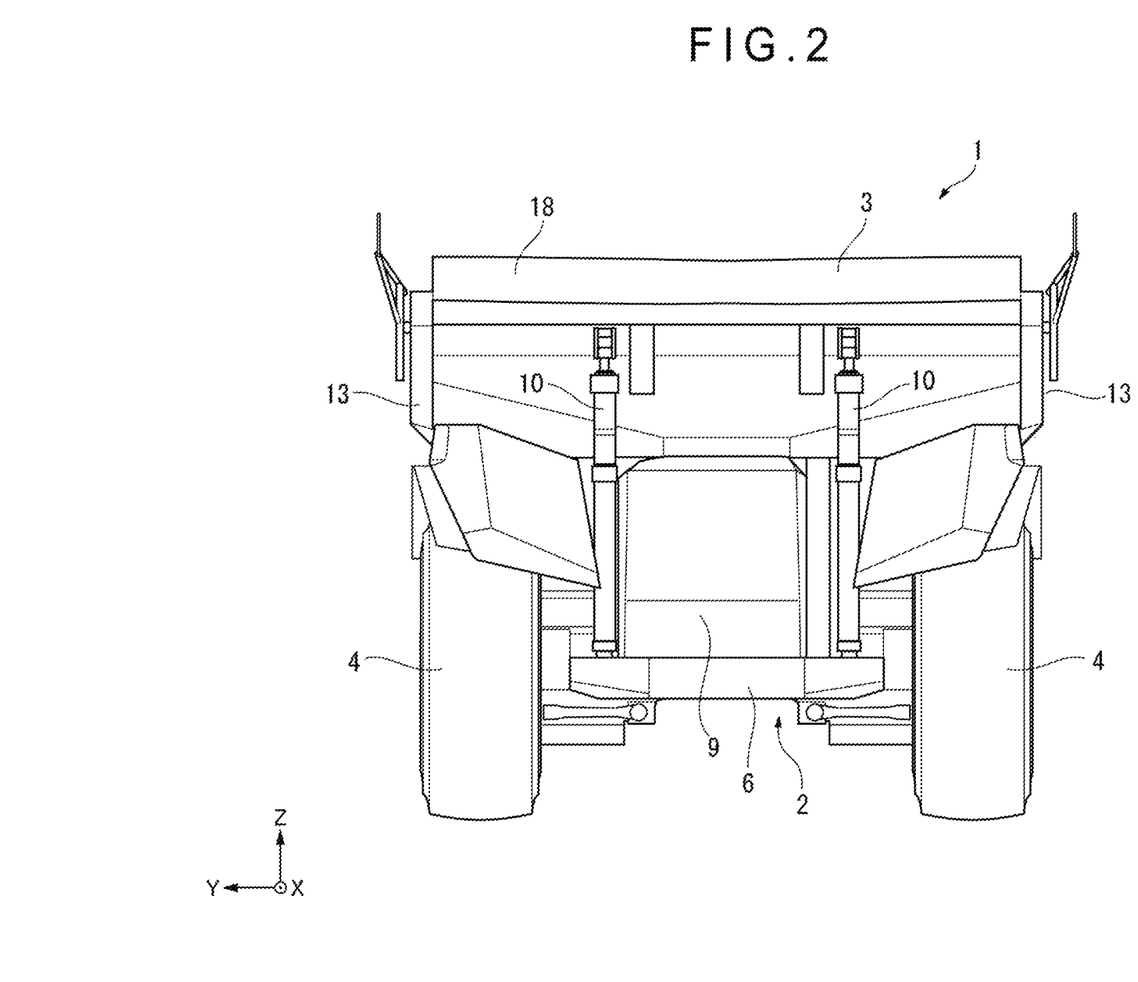
FIG. 2 is a front elevational view showing the dump truck according to the exemplary embodiment.
Figure 3:
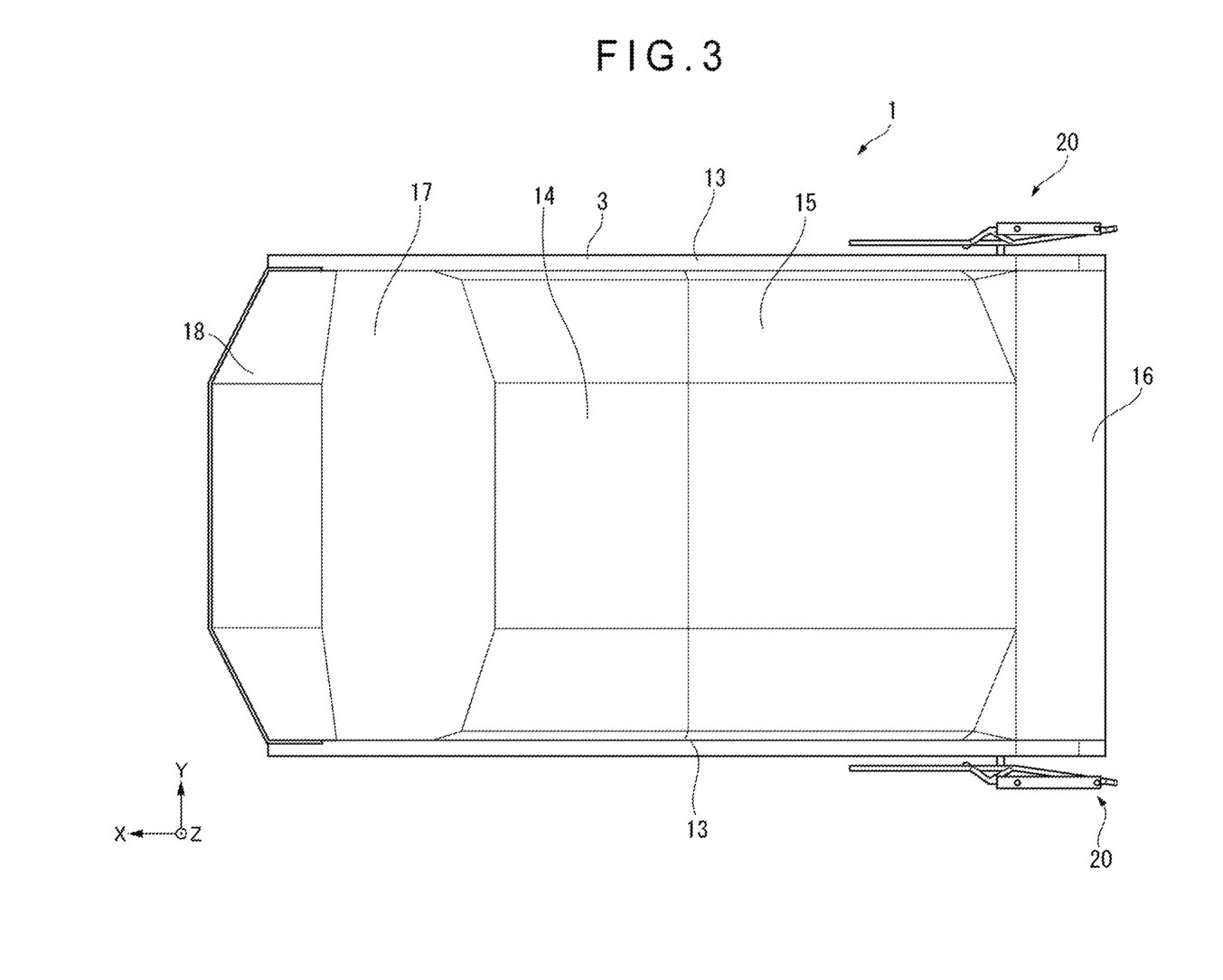
FIG. 3 is a plan view showing the dump truck according to the exemplary embodiment.

FIGS. 1 to 3 show a dump truck 1 according to an exemplary embodiment of the invention. FIG. 1 is a side elevational view showing the dump truck 1 in a vehicle-width direction orthogonal to a travel direction. FIG. 2 is a side elevational view showing the dump truck 1 in the travel direction. FIG. 3 is a plan view showing the dump track 1 as seen from the above.

It should be noted that X axis, Y axis and Z axis in the exemplary embodiment shown in each of the figures are orthogonal to one another. Further, the travel direction, the vehicle-width direction and a vertical direction are defined as follows for the convenience of description in the exemplary embodiment. Specifically, with reference to FIG. 1, the travel direction of the dump truck 1 is represented by an arrow in the X axis (a first travel direction being defined in the direction indicated by the arrow extending in the X axis, a second travel direction being defined in the direction opposite thereto); the vehicle-width direction is represented by the Y axis (a first vehicle-width direction being defined in the direction indicated by the arrow extending in the Y axis, a second vehicle-width direction being defined in the direction opposite thereto); and the vertical direction is represented by the Z axis (a first vertical direction being defined in the direction indicated by the arrow extending in the Z axis, a second vertical direction being defined in the direction opposite thereto). It should also be noted that the first travel direction is sometimes referred to as "front"; the second travel direction is sometimes referred to as "rear"; the first vehicle-width direction is sometimes referred to as "right"; and the second vehicle-width direction is sometimes referred to as "left" in the exemplary embodiment below for the purpose of convenience, since a chassis 2 and a dump body 3 are each in a rectangular shape with front and rear sides and right and left sides.

The dump truck 1, or an unmanned off-road dump truck driven by remote control, may be a vehicle operable at a digging site for developing mines. The remote control is conducted with full use of information and communication technologies, such as communication units provided at a control center and the dump truck 1, and the global positioning system (GPS).

The dump truck 1 includes the chassis 2 and the dump body 3. The dump truck 1 is configured to travel ahead in both front and rear directions with loads (e.g., earth and sand) being loaded in the dump body 3, and to dump the loads in a −X axis direction (the second travel direction in FIG. 1). It should be noted that "traveling ahead" means that the truck, which has indistinguishable front and rear sides, can similarly move irrespective of whether it travels ahead in the front or rear direction.

The chassis 2 is configured to travel by being supported by a pair of right and left tires 4, which are provided at a first side of the chassis 2 in the travel direction and arranged side by side in the vehicle-width direction, and a pair of tires 5, which are provided at a second side of the chassis 2 in the travel direction and arranged side by side in the vehicle-width direction. The chassis 2 includes a frame 6 elongated in the travel direction. Each of the tires 4, 5 is attached to the frame 6 via a suspension 30 (see FIG. 4).

The frame 6 includes a pair of upper side members 6A and a pair of lower side members 6B at both sides of the chassis 2, the upper and lower side members 6A, 6B extending in the travel direction. Each of the upper side members 6A and the corresponding one of the lower side members 6B, which are vertically spaced apart from each other, are interconnected by vertical members 6C at positions corresponding to attachment positions for the tires 4 and 5. The pair of upper side members 6A, which are arranged side by side in the vehicle-width direction, are mutually connected by a plurality of upper cross members 6D (see FIG. 4) extending in the vehicle-width direction. The pair of lower side members 6B are mutually connected by a plurality of lower cross members 6E (see FIG. 4) extending in the vehicle-width direction. In other words, the frame 6 forms a rectangular parallelepiped framework as seen in the travel direction of the chassis 2.

On the frame 6, an engine 7, a radiator 8, a controller 9, an obstacle detection sensor (not shown), and a hoist cylinder 10 are mounted. It should be noted that the dump truck 1, which is a vehicle dedicated for remote control, has no cab for a drive operation as provided in a typical dump truck.

The engine 7 is provided between the upper side members 6A and the lower side members 6B of the frame 6. An upper part of the engine 7 projects beyond the upper side members 6A.

The engine 7 is also provided at a rear side of the tires 4 and inside a wheel base W defined by rotation centers of the tires 4 and the tires 5. The center of gravity of the dump truck 1 is located substantially at the center of the chassis 2.

The radiator 8, or a pair of radiators herein, are arranged on both sides of the chassis 2 in the vehicle-width direction and substantially at the center of the chassis 2 to cool a cooling water for the engine 7.

The controller 9 is configured to control the travel of the dump truck 1 based on sensor information sent from the obstacle detection sensor provided at a dump end of the chassis 2, a temperature sensor provided to the engine 7, rotation sensors provided to the tires 4, 5, and the like.

The hoist cylinder 10 is provided in a pair (two hoist cylinders) and arranged in the vehicle-width direction at a rear side of the controller 9. A proximal end of each of the hoist cylinders 10 is rotatably connected to the frame 6 and a distal end of each of the hoist cylinders 10 is rotatably connected to a lower face of an end of the dump body 3 opposite the dump end.

The hoist cylinders 10 are actuated by a hydraulic oil delivered from a hydraulic pump (not shown), which is provided in the frame 6 and driven by the engine 7.

2. Structure of Dump Body 3

The dump body 3 covers an entire length (i.e., a dimension in the travel direction) and an entire width (i.e., a dimension in the vehicle-width direction) of the chassis 2 in a plan view. The dump end of the dump body 3 extends beyond an end of the chassis 2. As shown in FIG. 3, the dump body 3 is in the form of a rectangular box in the plan view. It should be noted that the dump body 3 is seen the same in a front-rear direction, since the dump body 3 is in a rectangular shape and the chassis 2 is similarly in a rectangular shape defined in the front-rear direction. The dump body 3 is thus configured to travel ahead in two directions (referred to as "front and rear direction" for the purpose of convenience). The dump body 3 is mounted on a body mount 6F (see FIG. 4).

The frame 6 has an end in the travel direction, i.e., a dump end, where the dump body 3 is attached via a hinge 12 in a manner capable of being raised or lowered (i.e., tiltable). The dump body 3 is raised or lowered around the hinge 12 on the frame 6 by extension and retraction of the above-described hoist cylinders 10.

As shown in FIGS. 1 and 3, the dump body 3, which is in the form of a rectangular box in the plan view, includes a pair of side plates 13, a bottom 14, a first slant surface 15, a second slant surface 16, and a front surface 17. The first slant surface 15 rises upward from a rear portion of the bottom 14. The second slant surface 16 declines downward from an upper end of the first slant surface 15. The front surface 17 rises upward from a front portion of the bottom 14. The front surface 17 has an upper end provided with a projection 18.

The pair of side plates 13 of the dump body 3 each have a dump side (i.e., a rear end) having an exterior surface where an antenna unit 20 is rotatably attached.

3. Structure of Frame 6

Next, a structure of the frame 6 will be described with reference to FIG. 4.

Figure 4:
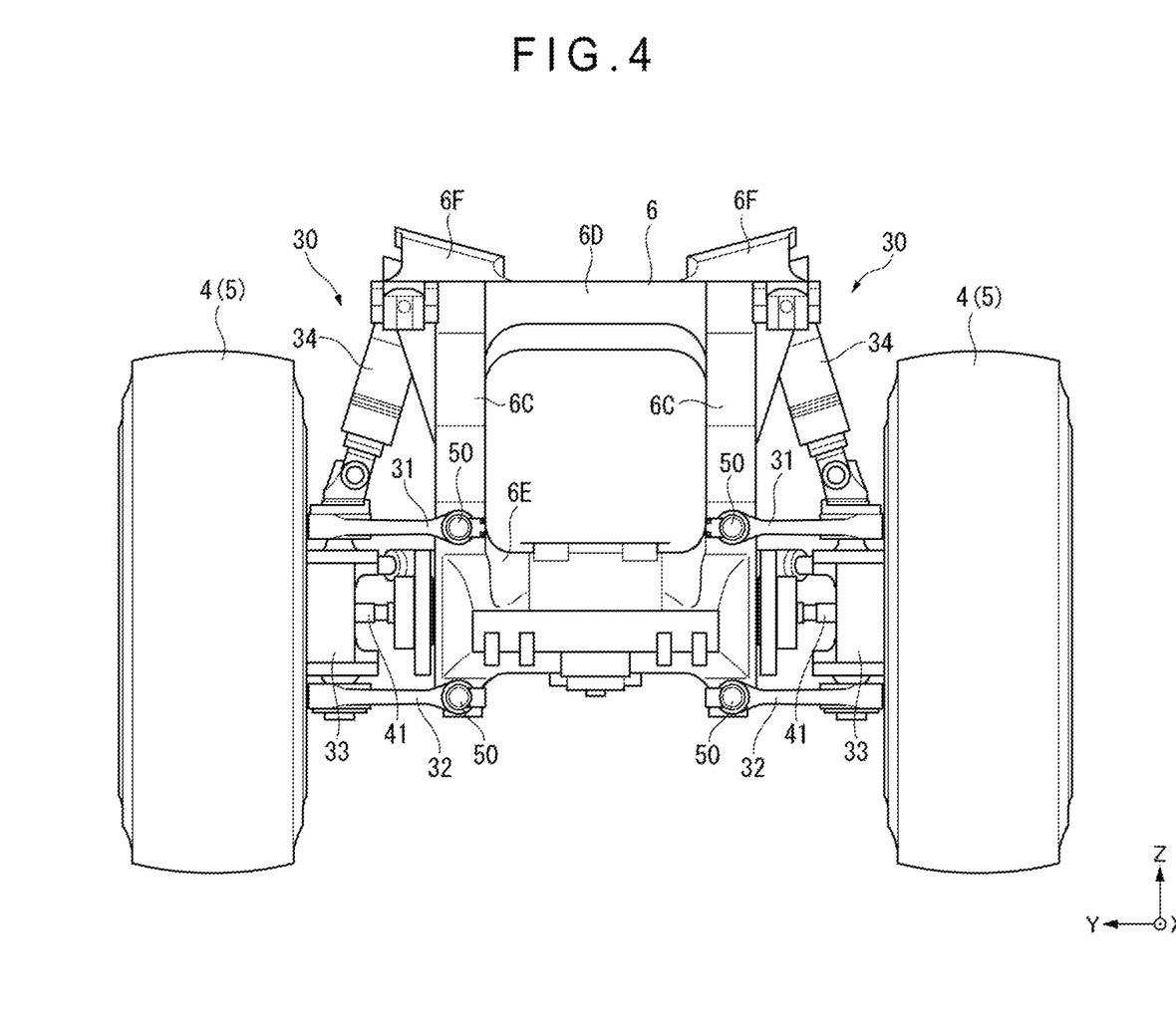
FIG. 4 is a front elevational view showing a frame of the dump truck and an attaching structure for a suspension arm of the dump truck according to the exemplary embodiment.

As shown in FIG. 4, the vertical members 6C, which are square steel pipes, are individually provided to ends of the frame 6 in the vehicle-width direction corresponding to the positions of the tires 4 and 5 in the travel direction shown in FIG. 1. The vertical members 6C vertically connect the upper side members 6A and the lower side members 6B. The two of vertical members 6C provided to the ends in the vehicle-width direction have upper ends that are connected to each other by the corresponding one of the upper cross member 6D extending in the vehicle-width direction, and lower ends that are connected to each other by the corresponding one of the lower cross members 6E extending in the vehicle-width direction, thus forming a portal frame at each of front and rear sides of the frame 6.

The body mount 6F is provided on the top of each of the vertical members 6C so that the weight of loads in the dump body 3 is received by the frame 6.

Figure 5:
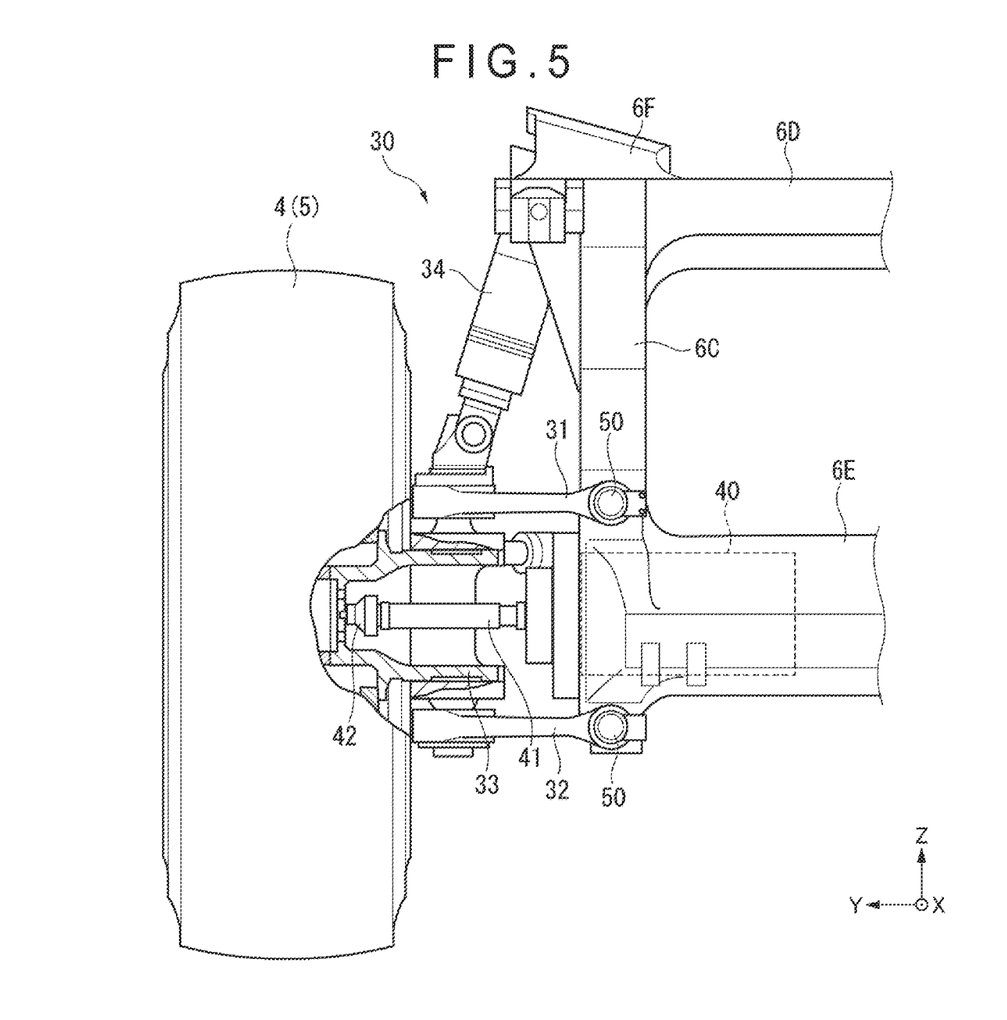
FIG. 5 is a front elevational view showing the attaching structure for the suspension arm of the dump truck according to the exemplary embodiment.

The lower cross members 6E, which are cylindrical steel pipes, are each configured to accommodate therein a traveling drive motor, i.e., an electric motor 40, as shown in FIG. 5. The electric motor 40 is configured to be driven by an electric energy generated by a motor generator (not shown) configured to be driven by an output from the engine 7.

The lower cross members 6E each have an end from which a drive shaft 41 of the electric motor 40 projects. The end of the drive shaft 41 is connected to a final reduction gear 42 that employs a planetary gear mechanism.

A case 33 of the later-described suspension 30 is set on the final reduction gear 42. A wheel of each of the tires 4(5) is attached to the case 33.

The dump truck 1 of the exemplary embodiment, the tires 4(5) of which are each driven by the electric motor 40, is an all-wheel-drive working vehicle.

Further, the lower cross members 6E each define therein a cylindrical space for accommodating the electric motor 40. The electric motor 40 is thus directly or indirectly supported on an inner surface defining the cylindrical space, thereby reinforcing a hollow portion of each of the lower cross members 6E.

4. Structure of Suspension 30

As shown in FIG. 5, the suspension 30, which is a so-called double wishbone suspension, includes an upper arm 31, a lower arm 32, the case 33 held between the upper arm 31 and the lower arm 32, and a suspension cylinder 34 connected to the case 33.

Figure 6:
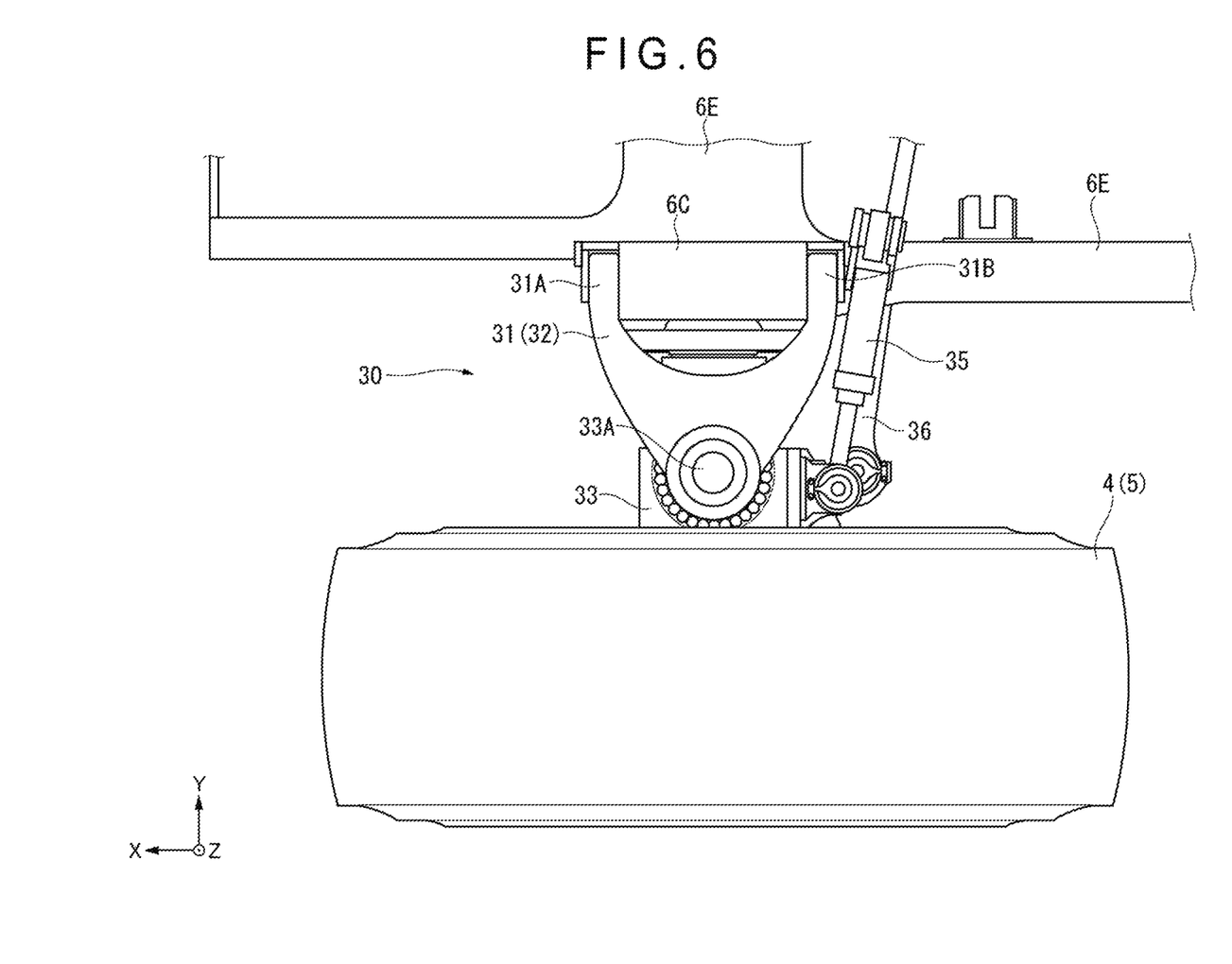
FIG. 6 is a plan view showing the attaching structure for the suspension arm of the dump truck according to the exemplary embodiment.

As shown in FIG. 6, the upper arm 31 and the lower arm 32 (i.e., suspension arms) are each in an A-shape in a plan view.

Such an A-shaped upper arm 31, which has an apex pointed outward in the vehicle-width direction, includes two legs 31A, 31B branched from the apex. The legs 31A, 31B receive therebetween front and rear surfaces of the corresponding one of the vertical members 6C, which are arranged in the travel direction of the dump truck 1 (X axis direction). The legs 31A, 31B are each attached to the vertical member 6C using an arm attachment 50 to be vertically pivotable. The lower arm 32 has the same structure.

The case 33, which is made of a cylindrical steel pipe, includes upper and lower ball joints 33A arranged on top and bottom sides in the vehicle-width direction and respectively connected to the apexes of the A-shaped upper arm 31 and lower arm 32. The case 33 is thus pivotably held between the upper arm 31 and the lower arm 32.

The case 33 is also connected to a steering cylinder 35 and a steering arm 36. Extension and retraction of the steering cylinder 35 can change a steering angle of the related one of the tires 4(5). It should be noted that the steering cylinder 35 and the steering arm 36 are provided to each of the tires 4, 5 such that the dump truck 1 functions as an all-wheel-steering dump truck 1.

As shown in FIG. 5, the suspension cylinder 34 has an upper end rotatably connected to a side surface of the corresponding one of the vertical members 6C, and a lower end rotatably connected to an upper surface of the upper arm 31.

The weight of the loads in the dump body 3 is received by the vertical members 6C and the suspension cylinders 34, and transferred to each of the tires 4(5) through the upper arm 31 and the case 33.

Accordingly, the vertical members 6C, which receive the weight of the loads, need to be strengthened, and thus the upper arm 31 and the lower arm 32 need to be attached to the corresponding ones of the strong vertical members 6C with a high firmness.

5. Detailed Structure of Arm Attachment 50

Next, a detailed structure of the arm attachment 50 will be described with reference to FIGS. 7 to 11.

Figure 7:
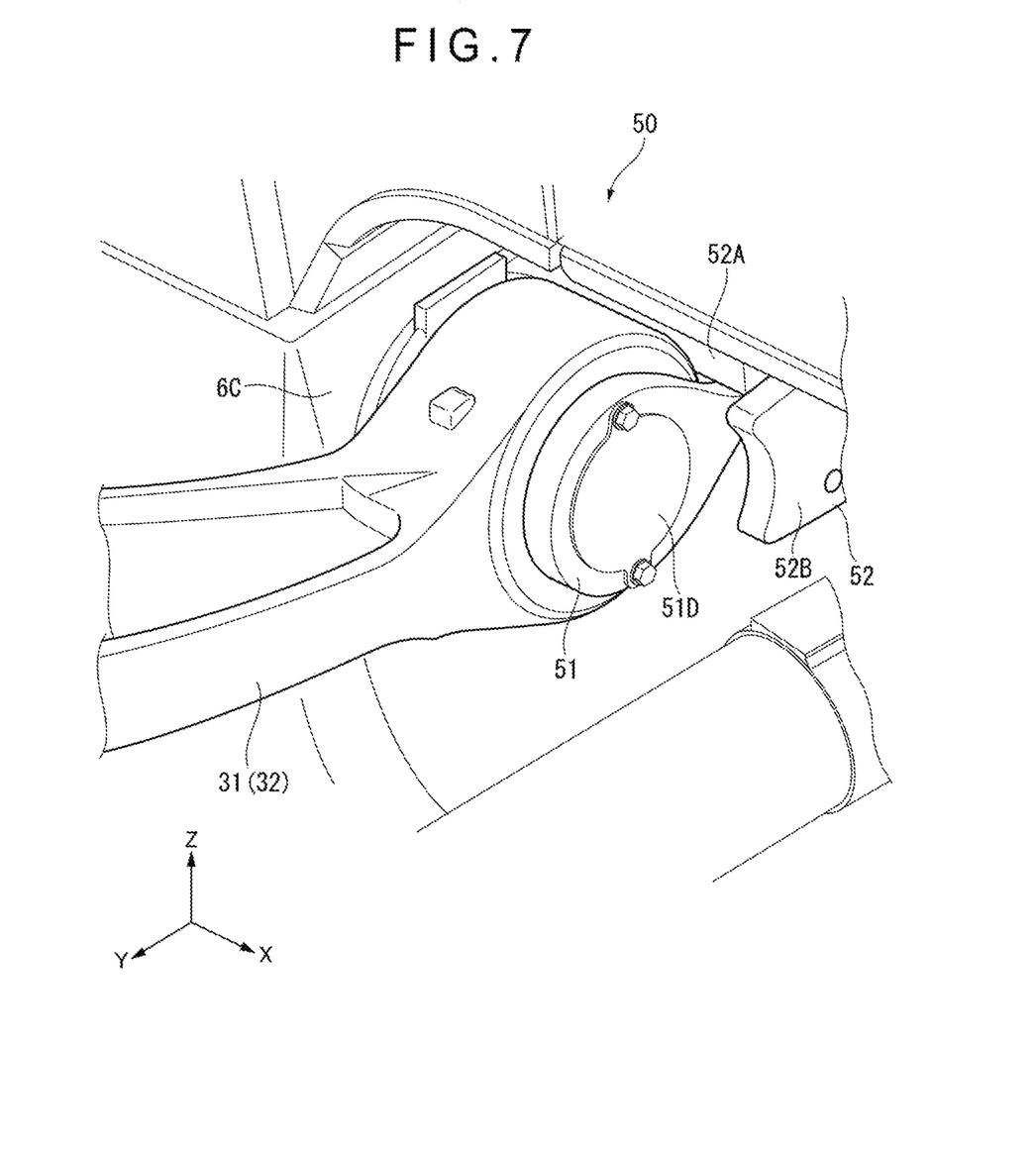
FIG. 7 is a perspective view showing the attaching structure for the suspension arm of the dump truck according to the exemplary embodiment.

As shown in FIG. 7, the upper arm 31 and the lower arm 32 are each pivotably attached to the front and rear surfaces of the corresponding one of the vertical members 6C using the arm attachment 50.

The arm attachment 50 includes a cantilevered pin 51, and a retaining mechanism 52 configured to prevent the cantilevered pin 51 from coming off a hole provided to the vertical member 6C.

Figure 8:
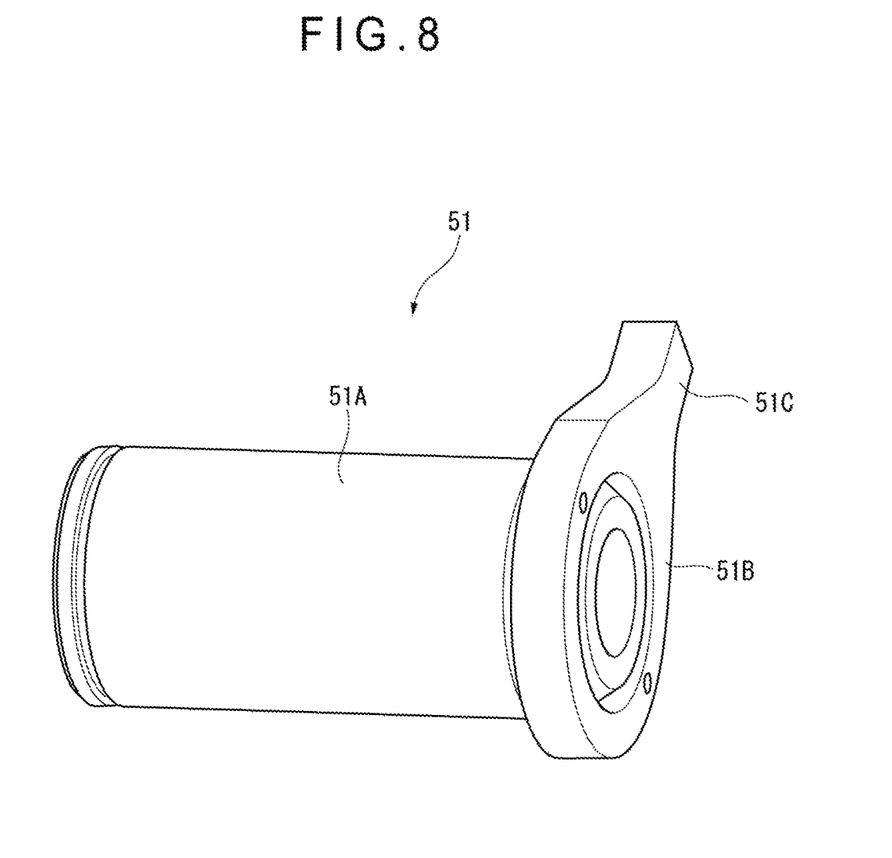
FIG. 8 is a perspective view showing a cantilevered pin of the attaching structure for the suspension arm of the dump truck according to the exemplary embodiment.

As shown in FIG. 8, the cantilevered pin 51, which includes an insertion portion 51A, a flange 51B, a projection 51C, and a cover 51D (see FIG. 7), is inserted into a hole 6C1 (see FIG. 9) provided to the vertical member 6C to hold each of the legs of the upper arm 31 and the lower arm 32 such that the upper arm and the lower arm are pivotable.

Figure 9:
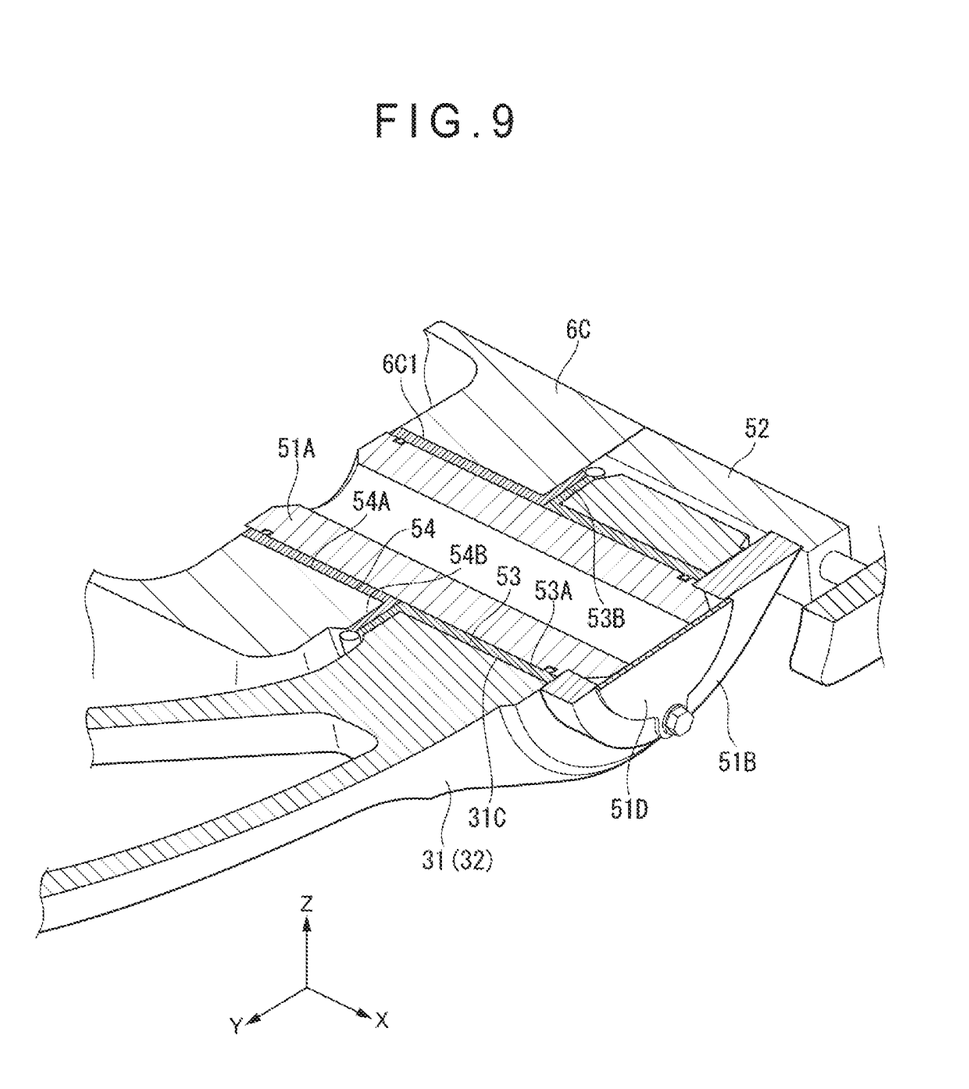
FIG. 9 is a sectional view showing the attaching structure for the suspension arm of the dump truck according to the exemplary embodiment.

As shown in FIG. 9, the insertion portion 51A, which is made of a heavy annular steel pipe, is inserted into a hole 31C provided to the upper arm 31 and the hole 6C1 provided to the front (rear) surface of the vertical member 6C. It should be noted that the hole 31C and the hole 6C1 are each in the form of a through hole defined in an out-of-plane direction, more preferably a normal direction, of each of the vertical members 6C.

The flange 51B, which is provided to a base end of the pin 51 in an insertion direction, extends outward in a radial direction of the pin 51 to restrain the upper arm 31 from moving in the insertion direction of the pin 51 (the front-rear direction of the dump truck 1).

The projection 51C, which projects from the flange 51B further outward in the radial direction, is engaged with the retaining mechanism 52 to prevent the pin 51 from coming off the hole 6C1.

The cover 51D, which is a member for covering a base end surface of the pin in the insertion direction, is screwed to the flange 51B.

The hole 31C of the upper arm 31 is provided with a bushing 53. The hole 6C1 of each of the vertical members 6C is provided with a bushing 54. Each of the bushing 53 and the bushing 54 is a hat-shaped bushing. The bushing 53 includes an insertion portion 53A and a flange 53B, and the bushing 54 includes an insertion portion 54A and a flange 54B.

When the upper arm 31 is attached to the vertical member 6C, the flange 53B of the bushing 53 and the flange 54B of the bushing 54 are brought into contact with each other to serve as sliding surfaces during the rotation of the upper arm 31 relative to the vertical member 6C.

Since the flange 53B and the flange 54B serve as the sliding surfaces, a surface of the vertical member 6C (i.e., a structure) and a side surface of the upper arm 31 are prevented from coming into direct contact with each other during the rotation of the upper arm 31, improving a durability of the arm attachment 50. If the flange 53B and the flange 54B become thinner with age, the bushings 53 and 54 may be overhauled and inserted again. The firmness of the arm attachment 50 can thus be maintained over a long period of time.

Figure 10:
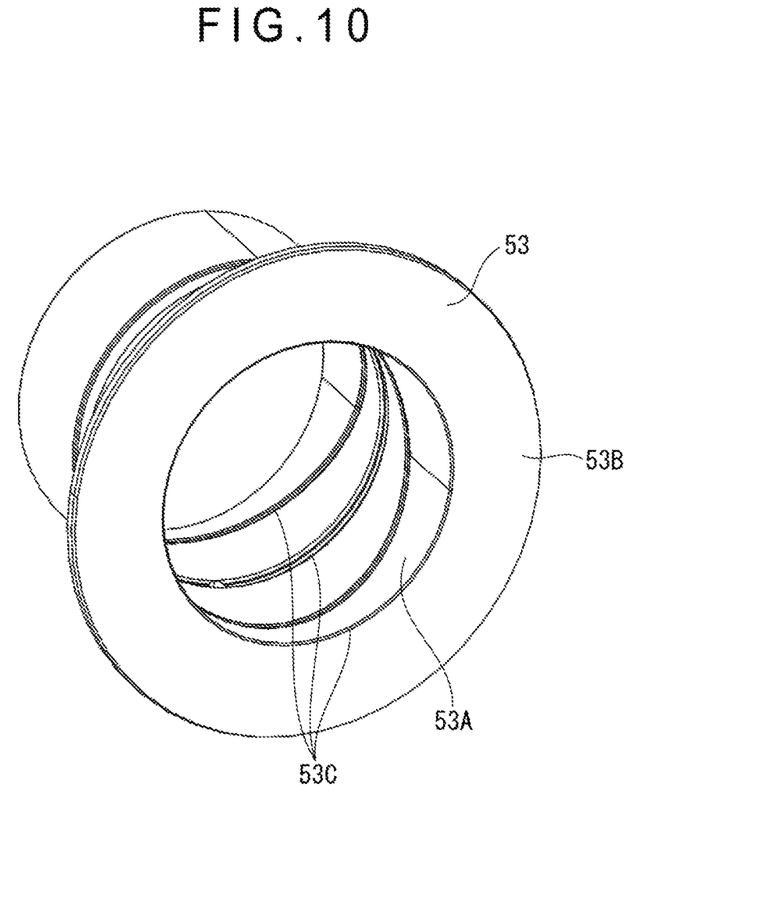
FIG. 10 is a perspective view showing a bushing of the attaching structure for the suspension arm of the dump truck according to the exemplary embodiment.

Further, as shown in FIG. 10, the insertion portion 53A of the bushing 53 has an inner circumferential surface provided with a plurality of grooves 53C formed along a rotation direction of the pin 51. These grooves inside the insertion portion 53A receive, for instance, a lubricating oil poured with the cover 51D being removed from the pin 51. In other words, the cover 51D prevents leakage of the poured lubricating oil.

The plurality of grooves 53C are provided inside the insertion portion 53A so that the lubricating oil allows a base side of the insertion portion 51A of the pin 51 to more smoothly slide than a distal side thereof during the rotation of the upper arm 31. Consequently, a distal portion of the insertion portion 51A, which is inserted in the hole 6C1 of the vertical member 6C, is prevented from corotation, so that the pin 51 is unlikely to come off the hole 6C1 of the vertical member 6C.

Figure 11:
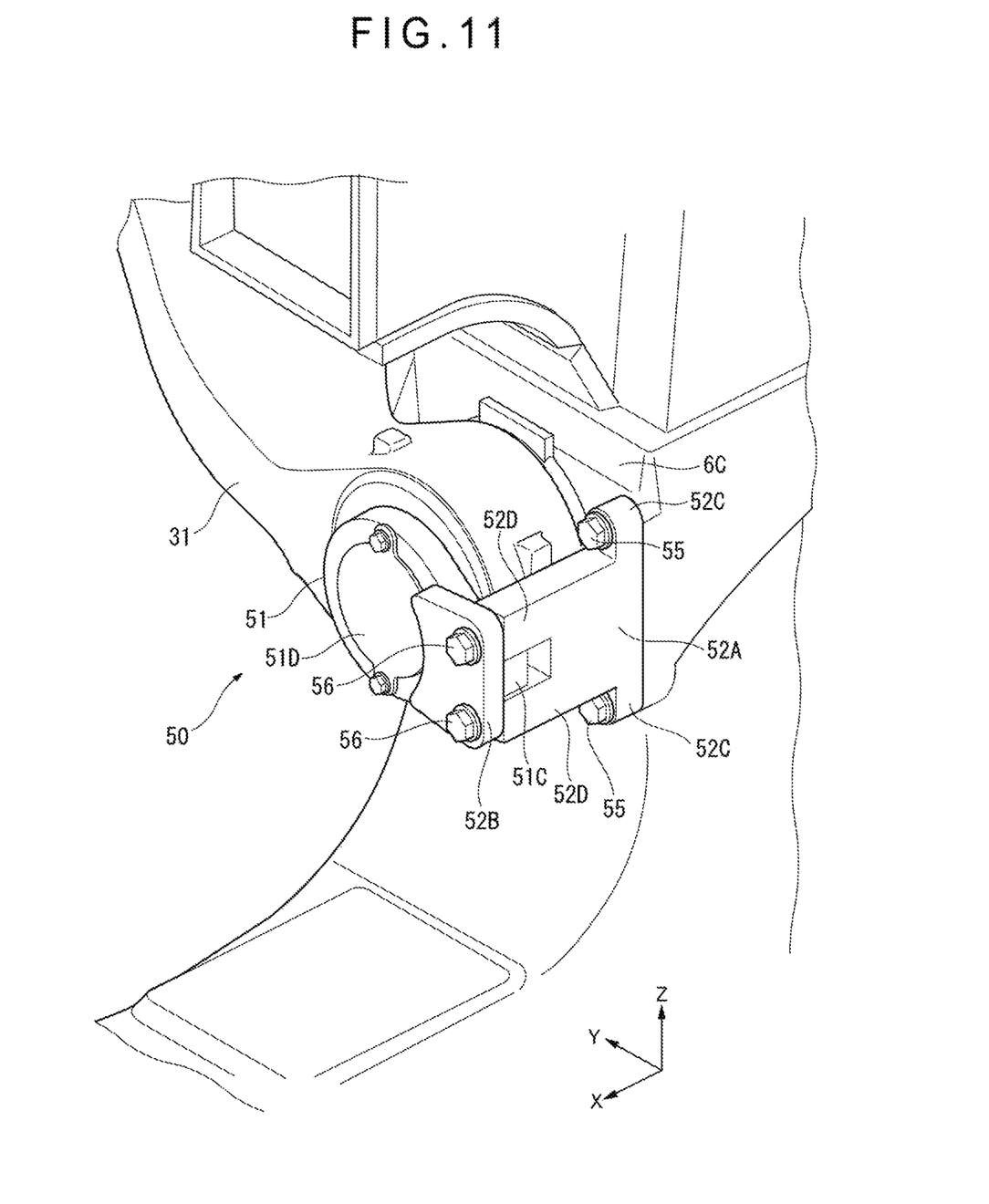
FIG. 11 is a perspective view showing the attaching structure for the suspension arm of the dump truck according to the exemplary embodiment.

The retaining mechanism 52, which is configured to prevent the cantilevered pin 51 from coming off the vertical member 6C, includes a holding portion 52A and a cover portion 52B as shown in FIG. 11.

The holding portion 52A, which is made by cutting a periphery of a heavy steel plate, has a base side being brought into contact with the surface of the vertical member 6C, and a distal side defined in the out-of-plane direction of the vertical member 6C. The holding portion 52A includes fixed portions 52C located at the base side and projecting in a width direction along the surface of the vertical member 6C, and holding pieces 52D projecting toward the distal side.

The fixed portions 52C are each provided with a through hole that receives a bolt 55. The bolt 55 is then threadably engaged with an internally threaded bore provided to the vertical member 6C, thereby fixing the fixed portion 52C.

The holding pieces 52D are in the form of projections that extend toward the distal side from both ends in the width direction, forming a recess substantially at a center therebetween. The holding pieces 52D each have a distal end surface provided with an internally threaded bore.

The cover portion 52B is made of a heavy steel plate and provided with two through holes, each of which receives a bolt 56. The received bolt 56 is then threadably engaged with the internally threaded bore of each of the holding pieces 52D, thereby fixing the cover portion 52B.

The recess defined by the holding pieces 52D provides a space that receives the projection 51C of the pin 51. Further, the two holding piece 52D hold the projection 51C therebetween in the rotation direction of the pin 51. The rotation of the pin 51 is thus restrained.

Further, the cover portion 52B is fixed on a distal end of the holding portion 52A to restrain an axial displacement of the pin 51 of the projection 51C, thus preventing the cantilevered pin 51 from coming off the hole 6C1 of the vertical member 6C (see FIG. 9).

In attaching the upper arm 31 to the vertical member 6C using the arm attachment 50, the holding portion 52A is first fixed to each of the front and rear surfaces of the vertical member 6C using the bolt 55. Next, the pin 51 is inserted into the hole 31C of the upper arm 31 and inserted into the hole 6C1 of the vertical member 6C.

After the projection 51C is fitted between the holding pieces 52D, the cover portion 52B is fixed using the bolt 56.

The arm attachment 50 having the above attaching structure allows the attachment parts to be individually fixed with an improved work efficiency and, further, allows the upper arm 31 and the lower arm 32 to be easily attached to the vertical member 6C irrespective of an increase in the size of the arms.

According to the exemplary embodiment, the arm attachment 50 that allows the upper arm 31 and the lower arm 32 to be easily attached to the sufficiently strengthened frame 6 of the large dump truck 1 for carrying heavy loads and achieves a sufficient firmness can be provided.

6. Modifications

It should be understood that the scope of the invention is not limited to the above-described exemplary embodiment, but includes modification(s) and improvement(s) as long as an object of the invention can be achieved.

For instance, although the arm attachment 50 is used, but not limited to, in the remotely controllable dump truck 1 in the exemplary embodiment, the arm attachment 50 may be used in an ordinary dump truck driven by manned operation.

Further, although the invention is applied to the dump truck 1 in the exemplary embodiment, the invention is also applicable to any other working vehicle such as a wheel loader.

The structures and the like according to the invention may be altered in any manner as long as an object of the invention can be achieved.

The invention claimed is:

1. A suspension arm attaching structure for attaching at least one suspension arm to at least one vertical member of a frame of a working vehicle, the suspension arm being an A-shaped suspension arm in a plan view that comprises legs configured to receive therebetween front and rear surfaces of the vertical member arranged in a travel direction of the working vehicle, the legs of the suspension arm and the front and rear surfaces of the vertical member each being provided with a hole, the attaching structure comprising:
   a cantilevered pin configured to be inserted into the hole of each of the legs of the suspension arm and into corresponding one of the holes of the vertical member to hold the leg of the suspension arm such that the suspension arm is pivotable; and
   a retaining mechanism for the pin provided to the frame, wherein
   the pin comprises a projection at a base end thereof in an insertion direction, the projection extending radially outward, and
   the retaining mechanism comprises:
   a holding portion configured to hold the projection in a rotation direction of the pin; and
   a cover portion configured to cover the projection in the insertion direction of the pin.

2. The suspension arm attaching structure according to claim 1, wherein the holes of the suspension arm are each provided with a first bushing.

3. The suspension arm attaching structure according to claim 2, wherein the first bushing has an inner surface provided with a groove for receiving a lubricating oil.

4. The suspension arm attaching structure according to claim 2, wherein
   the holes of the vertical member are each provided with a second bushing comprising a second flange for covering the front surface or the rear surface of the vertical member,
   the first bushing of the suspension arm comprises a first flange in a surface being brought into contact with the vertical member, and
   the first and second flanges of the first and second bushings slide as the suspension arm rotates.

5. A working vehicle comprising the suspension arm attaching structure according to claim 1.

6. The working vehicle according to claim 5, wherein the frame comprises:
   the at least one vertical member comprising a first vertical member and a second vertical member each located at an end in a vehicle-width direction orthogonal to the travel direction; and
   a cross member extending in the vehicle-width direction and connecting a lower end of the first vertical member to a lower end of the second vertical member, the cross member being configured to accommodate therein a traveling drive motor.

* * * * *